(12) United States Patent
Bernat et al.

(10) Patent No.: US 10,237,169 B2
(45) Date of Patent: Mar. 19, 2019

(54) TECHNOLOGIES FOR QUALITY OF SERVICE BASED THROTTLING IN FABRIC ARCHITECTURES

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Raj K. Ramanujan, Federal Way, WA (US); Brian J. Slechta, Portland, OR (US)

(73) Assignee: Intel Corporation, Santa Clara, CA (US)

(*) Notice: Subject to any disclaimer, the term of this patent is extended or adjusted under 35 U.S.C. 154(b) by 19 days.

(21) Appl. No.: 15/088,948

(22) Filed: Apr. 1, 2016

(65) Prior Publication Data
US 2017/0289024 A1 Oct. 5, 2017

(51) Int. Cl.
*H04L 12/725* (2013.01)
*H04L 12/803* (2013.01)

(52) U.S. Cl.
CPC .......... *H04L 45/302* (2013.01); *H04L 47/125* (2013.01)

(58) Field of Classification Search
CPC ..... H04L 45/302; H04L 47/125; H04L 47/39; H04L 49/70
See application file for complete search history.

(56) References Cited

U.S. PATENT DOCUMENTS

| 6,192,452 B1 | 2/2001 | Bannister et al. |
| 2007/0226609 A1 | 9/2007 | Kato |
| 2009/0187628 A1 | 7/2009 | Desota et al. |
| 2013/0124826 A1* | 5/2013 | Merchant ............. G06F 9/3851 712/205 |
| 2015/0180782 A1* | 6/2015 | Rimmer .................. H04L 69/22 370/236 |

FOREIGN PATENT DOCUMENTS

JP 2016-004461 1/2016

OTHER PUBLICATIONS

International Search Report in PCT application No. PCT/US2017/020396, dated May 24, 2017 (3 pages).
Written Opinion in PCT application No. PCT/US2017/020396, dated May 24, 2017 (6 pages).

* cited by examiner

*Primary Examiner* — Jamal Javaid
(74) *Attorney, Agent, or Firm* — Barnes & Thornburg LLP

(57) ABSTRACT

Technologies for quality of service based throttling in a fabric architecture include a network node of a plurality of network nodes interconnected across the fabric architecture via an interconnect fabric. The network node includes a host fabric interface (HFI) configured to facilitate the transmission of data to/from the network node, monitor quality of service levels of resources of the network node used to process and transmit the data, and detect a throttling condition based on a result of the monitored quality of service levels. The HFI is further configured to generate and transmit a throttling message to one or more of the interconnected network nodes in response to having detected a throttling condition. The HFI is additionally configured to receive a throttling message from another of the network nodes and perform a throttling action on one or more of the resources based on the received throttling message. Other embodiments are described herein.

14 Claims, 7 Drawing Sheets

TECHNOLOGIES FOR QUALITY OF SERVICE BASED THROTTLING IN FABRIC ARCHITECTURES

BACKGROUND

Demands by individuals, researchers, and enterprises for increased compute performance and storage capacity of computing devices have resulted in various computing technologies developed to address those demands. For example, compute intensive applications, such as enterprise cloud-based applications (e.g., software as a service (SaaS) applications), data mining applications, data-driven modeling applications, scientific computation problem solving applications, etc., typically rely on complex, large-scale computing environments (e.g., high-performance computing (HPC) environments, cloud computing environments, etc.) to execute the compute intensive applications, as well as store voluminous amounts of data. Such large-scale computing environments can include tens of hundreds (e.g., enterprise systems) to tens of thousands (e.g., HPC systems) of multiprocessor/multi-core network nodes connected via high-speed interconnects (e.g., fabric interconnects in a unified fabric).

To carry out such processor intensive computations, various computing technologies have been implemented to distribute workloads across different network computing devices, such as parallel computing, distributed computing, etc. In support of such distributed workload operations, multiprocessor hardware architecture (e.g., multiple multi-core processors that share memory) has been developed to facilitate multiprocessing (i.e., coordinated, simultaneous processing by more than one processor) across local and remote shared memory systems using various parallel computer memory design architectures, such as non-uniform memory access (NUMA), and other distributed memory architectures.

Accordingly, memory requests from multiple interconnected network nodes can occupy the same shared buffer (e.g., super queues, table of requests, etc.) as local memory requests of a particular network node. However, such shared buffers are limited in size (e.g., containing tens of entries), which can result in other memory requests being queued until data returns from the memory subsystems for those memory requests presently in the shared buffer. As such, entries of the shared buffers tend to be occupied by those memory requests targeting memory that provides high latency access (e.g., memory requests received from remote network nodes) or that is being over-utilized. As a result, other requests (e.g., local memory requests) targeting faster or non-congested memory (i.e., memory requests that would be served faster) can become starved in the core due to no available shared buffer entries available to execute said memory requests.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
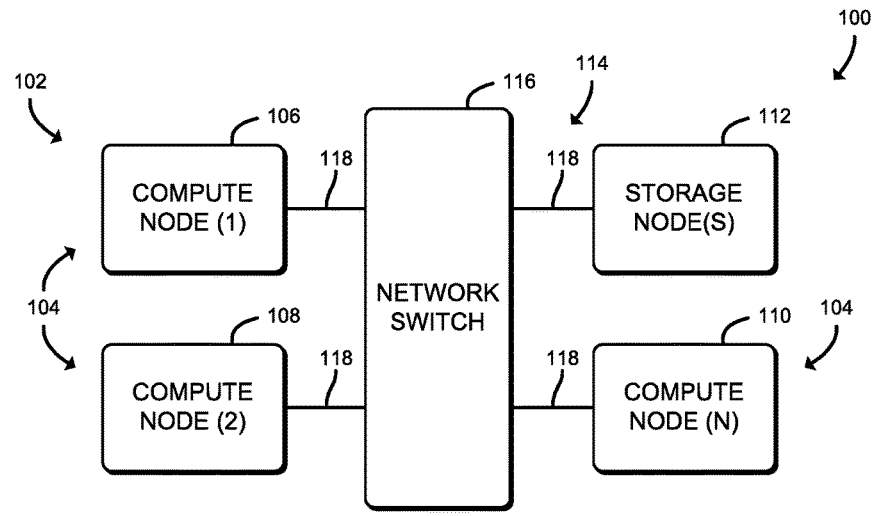
FIG. 1 is a simplified block diagram of at least one embodiment of a system for quality of service based throttling in a fabric architecture includes multiple interconnected network nodes communicatively coupled via an interconnect fabric.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for quality of service based throttling in a fabric architecture includes multiple interconnected network nodes 102 communicatively coupled via an interconnect fabric 114. The illustrative system 100 includes various types of network nodes 102 including multiple compute nodes 104 and storage nodes 112. The illustrative compute nodes 104 include a first compute node, which is designated as compute node (1) 106, a second compute node, which is designated as compute nodes (2) 108, and a third compute node, which is designated as compute nodes (N) 110 (i.e., the "Nth" compute node of the compute nodes 104, wherein "N" is a positive integer and designates one or more additional compute nodes 104). It should be appreciated that, in other embodiments, there may be any number of compute nodes 104 and/or storage nodes 112. Illustratively, the interconnect fabric 114 includes a network switch 116 and a number of fabric interconnects 118 for communicatively coupling the network nodes 102. It should be appreciated, however, that while only a single network switch 116 is shown, there may be any number of network switches 116 in other interconnect fabric embodiments.

In use, the network nodes 102 monitor quality of service levels associated with local resources (e.g., physical and/or virtual components) to detect throttling conditions (e.g., congestion, saturation, over-utilization, workload distribution unfairness, etc.) associated with such resources and transmit throttling messages to other network nodes 102 of the fabric architecture requesting a throttling action to be performed by the receiving network nodes 102 upon detection of such throttling conditions. The throttling messages may include various types throttling requests directed toward throttling particular resources of a network node 102. For example, the throttling messages may include a memory throttle request, an I/O throttle request, an accelerator throttle processing request, an HFI saturation throttle request, etc. It should be appreciated that the throttling messages are transmitted periodically over the period of time in which the throttling condition is detected. In other words, the network node 102 continues to transmit throttling messages until the corresponding throttling condition subsides.

To do so, unlike present technologies in which the network nodes 102 do not externally transmit the throttling messages, thereby leaving throttling restricted to being able to only throttle those resources local to the network nodes 102, components of the network nodes 102 and the associated interconnect fabric 114 are extended to transmit throttling information (e.g., generate new throttling messages, propagate existing throttling signals, etc.) to other network nodes 102 that are presently requesting access to a shared structure (e.g., a shared buffer) of the respective one of the network nodes 102 having detected the throttling condition.

In an illustrative example, certain coherency protocols include agent entities, such as the caching agents and home agents of Intel® coherency protocols, are configured to initiate transactions into coherent memory (e.g., via the caching agents) and service the coherent transactions (e.g., via the home agents). Such agent entities are presently configured to detect certain conditions local to a respective one of the network nodes 102 and issue local processor core throttling signals to throttle one or more cores of the processor. However, contention in fabric architectures can occur not only at the shared paths within each of the network nodes 102, but also in shared paths of the interconnect fabric 114, such as shared buffers (e.g., super queues in the processor core, table of requests in the caching/home agents, etc.).

In an illustrative example, the compute node (1) 106 may be accessing memory of the compute node (2) 108, which may be configured to monitor memory access requests (e.g., memory accesses received locally, memory accesses received from another of the compute nodes 104, etc.) and memory utilization level(s). Under certain conditions, the compute node (2) 108 may experience high and unequal contention due to memory request queue entries being occupied by requests to slower memory (e.g., non-cache memory) of the compute node (2) 108 that have been received from the compute node (1) 106. Accordingly, under such conditions, the compute node (2) 108 is configured to transmit a throttling message to the compute node (1) 106 indicating that memory of the compute node (2) 108 is presently saturated, which the compute node (1) can use to reduce an injection rate of memory requests directed to the compute node (2) 108.

In some embodiments, the network nodes 102 are configured to expose present node throttling techniques between different network nodes 102 of the system 100 using the transport layer (i.e., Layer 4 (L4)) of the Open Systems Interconnection (OSI) model. Accordingly, new and/or existing throttling signals originating from one of the network nodes 102 (e.g., from caching agents, home agents, input/output operations, schedulers, etc.) may be propagated over the fabric interconnects 118 to other network nodes 102, such as those requesting access to shared structures of the one of the network nodes 102 from which the throttling signals originated.

The network nodes 102 may be embodied as any type of network traffic (e.g., network packets, messages, data, etc.) computing and/or storage computing device that is capable of performing the functions described herein, such as, without limitation, a server (e.g., stand-alone, rack-mounted, blade, etc.), a network appliance (e.g., physical or virtual), a switch (e.g., rack-mounted, standalone, fully managed, partially managed, full-duplex, and/or half-duplex communication mode enabled, etc.), a router, a web appliance, a distributed computing system, and/or a multiprocessor-based system. As described previously, the illustrative network nodes 102 include compute nodes 104 and storage nodes 112; however, it should be appreciated that the network nodes 102 may include additional and/or alternative network nodes, such as controller nodes, network nodes, utility nodes, etc., which are not shown to preserve clarity of the description.

Figure 2:
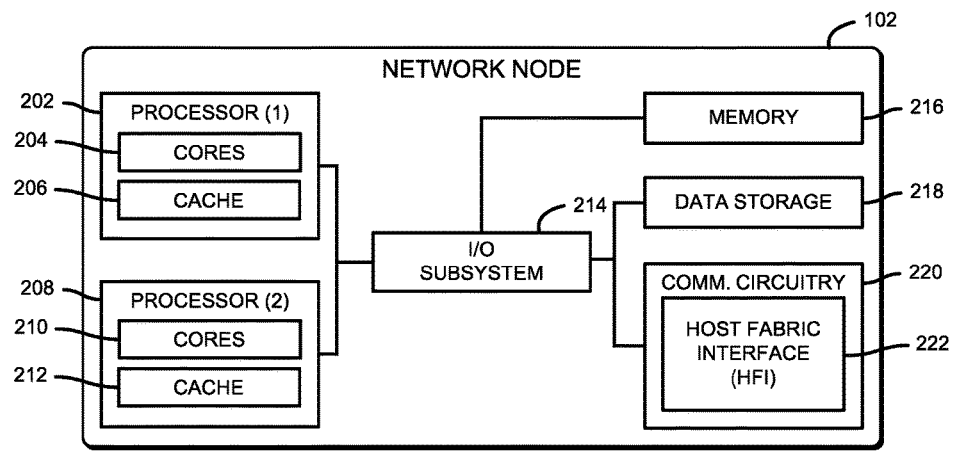
FIG. 2 is a simplified block diagram of at least one embodiment of one of the network nodes of the system of FIG. 1.

As shown in FIG. 2, an illustrative network node 102 includes a first processor, designated as processor (1) 202, a second processor, designated as processor (2) 208, an input/output (I/O) subsystem 214, a main memory 216, a data storage device 218, and communication circuitry 220. It should be appreciated that the compute nodes 104 and/or storage nodes 112 of FIG. 1 may include the components described in FIG. 2 of the illustrative network node 102.

Of course, the network node 102 may include other or additional components, such as those commonly found in a computing device, in other embodiments. Additionally, in some embodiments, one or more of the illustrative components may be incorporated in, or otherwise form a portion of, another component. For example, the cache memory 206, or portions thereof, may be incorporated in one or both of the processors 202, 208 in some embodiments. Further, in some embodiments, one or more of the illustrative components may be omitted from the network node 102. For example, although the illustrative network node 102 includes two processors 202, 208, the network node 102 may include a greater number of processors, in other embodiments.

Each of the processors 202, 208 (i.e., physical processor packages) may be embodied as any type of multi-core processor capable of performing the functions described herein, such as, but not limited to, a single physical multi-processor core chip, or package. The illustrative processor (1) 202 includes a number of processor cores 204, while the illustrative processor (2) 208 similarly includes a number of processor cores 210. As described previously, each of the processors 202, 208 includes more than one processor cores (e.g., 2 processors cores, 4 processors cores, 8 processors cores, 16 processors cores, etc.).

Each of processor cores 204, 210 is embodied as an independent logical execution unit capable of executing programmed instructions. In some embodiments, the processor cores 204, 210 may include a portion of cache memory (e.g., an L1 cache) and functional units usable to independently execute programs or threads. It should be appreciated that in some embodiments of the network node 102, such as supercomputers, the network node 102 may include thousands of processor cores. Each of the processors 202, 208 may be connected to a physical connector, or socket, on a motherboard (not shown) of the network node 102 configured to accept a single physical processor package (i.e., a multi-core physical integrated circuit).

The illustrative processor (1) 202 additionally includes a cache memory 206. Similarly, the illustrative processor (2) 208 also includes a cache memory 212. Each cache memory 206, 212 may be embodied as any type of cache that the respective processor 202, 208 can access more quickly than the main memory 216, such as an on-die cache, or on-processor cache. In other embodiments, the cache memory 206, 212 may be an off-die cache, but reside on the same system-on-a-chip (SoC) as the respective processor 202, 208. It should be appreciated that, in some embodiments, the cache memory 206, 212 may have a multi-level architecture. In other words, in such multi-level architecture embodiments, the cache memory 206, 212 may be embodied as an L1, L2, or L3 cache, for example.

The main memory 216 may be embodied as any type of volatile or non-volatile memory or data storage device capable of performing the functions described herein. In operation, the main memory 216 may store various data and software used during operation of the network node 102, such as operating systems, applications, programs, libraries, and drivers. The main memory 216 is communicatively coupled to the processors 202, 208 via the I/O subsystem 214, which may be embodied as circuitry and/or components to facilitate input/output operations with the processors 202, 208, the main memory 216, and other components of the network node 102. For example, the I/O subsystem 214 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 214 may form a portion of a SoC and be incorporated, along with one or both of the processors 202, 208, the main memory 216, and/or other components of the network node 102, on a single integrated circuit chip.

The data storage device 218 may be embodied as any type of device or devices configured for short-term or long-term storage of data such as, for example, memory devices and circuits, memory cards, hard disk drives, solid-state drives, or other data storage devices. It should be appreciated that the data storage device 218 and/or the main memory 216 (e.g., the computer-readable storage media) may store various data as described herein, including operating systems, applications, programs, libraries, drivers, instructions, etc., capable of being executed by a processor (e.g., the processor 202, the processor 208, etc.) of the network node 102.

The communication circuitry 220 may be embodied as any communication circuit, device, or collection thereof, capable of enabling communications between the network node 102 and other computing devices (e.g., a compute node 104, a storage node 112, etc.) over a network. The communication circuitry 220 may be configured to use any one or more communication technologies (e.g., wireless or wired communication technologies) and associated protocols (e.g., Internet Protocol (IP), Ethernet, Bluetooth®, Wi-Fi®, WiMAX, LTE, 5G, etc.) to effect such communication.

The illustrative communication circuitry 220 includes a host fabric interface (HFI) 222. The HFI 222 may be embodied as one or more add-in-boards, daughtercards, network interface cards, controller chips, chipsets, or other devices that may be used by the network node 102. For example, in some embodiments, the HFI 222 may be integrated with one or both of the processors 202, 208 (e.g., on a coherent fabric within one or both of the processors 202, 208), embodied as an expansion card coupled to the I/O subsystem 214 over an expansion bus (e.g., PCI Express (PCIe)), part of a SoC that includes one or more processors, or included on a multichip package that also contains one or more processors. Additionally or alternatively, in some embodiments, functionality of the HFI 222 may be integrated into one or more components of the network node 102 at the board level, socket level, chip level, and/or other levels. The HFI 222 is configured to facilitate the transfer to data/messages to enable tasks executing on the processors 202, 208 to access shared structures (e.g., shared physical memory) of the other network nodes 102, such as may be necessary during parallel or distributed computing operations.

It should be appreciated that those network nodes 102 implemented as storage nodes 112 may generally include more data storage device 218 capacity than those network nodes 102 implemented as compute nodes 104. Similarly, it should also be appreciated that those network nodes 102 implemented as compute nodes 104 may generally include more processor capability that those network nodes 102 implemented as storage nodes 112. In other words, the storage nodes 112 may be embodied as physical servers including numerous hard-disk drives (HDDs) or solid-state drives (SDDs) relative to the number of storage devices of the compute nudes 104, whereas the compute nodes 104 may be embodied as physical servers including numerous processors having multiple cores relative to the number of processors of the storage nodes 112. However, it should be further appreciated that any of the network nodes 102 may be implemented as a compute node 104 and/or a storage node 112, regardless of the component configuration relative to the other network nodes 102.

Referring again to FIG. 1, the interconnect fabric 114, illustratively the combination of the network switch 116 and the fabric interconnects 118, may be embodied as one or more buses, switches, and/or networks configured to support transmission of network traffic as a function of various interconnect protocols and/or network protocols. In use, the interconnect fabric 114 is utilized by the network nodes 102 (e.g., via respective HFIs 222) to communicate with the other network nodes 102 (i.e., across the interconnect fabric 114). Accordingly, the network switch 116 may be embodied as any type of switching device (e.g., a crossbar switch) capable of network traffic forwarding via the fabric interconnects 118 in a switched, or switching, fabric architecture.

Figure 3:
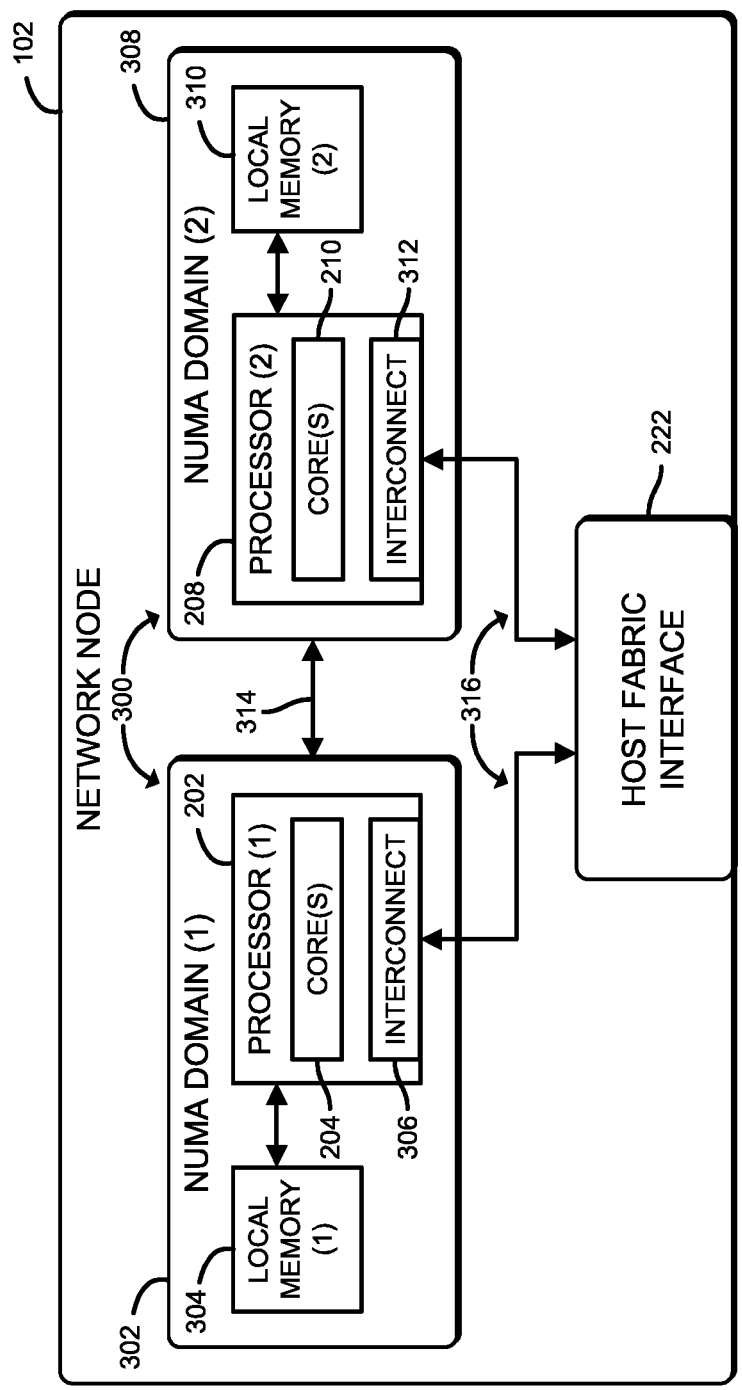
FIG. 3 is a simplified block diagram of another embodiment of the network node of FIG. 2.

Referring now to FIG. 3, in an illustrative embodiment, the network node 102 of FIG. 2 includes one or more non-uniform memory access (NUMA) domains 300 communicatively coupled to the HFI 222. The illustrative NUMA domains 300 include a first NUMA domain, designated as NUMA domain (1) 302, and a second NUMA domain, designated as NUMA domain (2) 308. Each of the NUMA domains 300 includes a number of allocated processor cores of a physical processor package, referred to herein as a processor. As shown in the illustrative embodiment, the NUMA domain (1) 302 includes the processor cores 204 of processor (1) 202 and the NUMA domain (2) 308 includes the processor cores 210 of processor (2) 208. However, it should be appreciated that, in some embodiments, the processor cores 204 of the processor 202 and/or the processor cores 210 of the processor 208 may be divided and each set of divided processor cores may be allocated to a different NUMA domain 300. It should be appreciated that each set of allocated processor cores assigned to a respective one of the NUMA domains 300 may be referred to as socket cores. In other words, the number of allocated cores of a physical processor package may be referred to as a socket.

Additionally, each of the NUMA domains 300 corresponds to a particular memory type (e.g., double data rate (DDR) memory, disk, etc.) and includes a portion of that memory type of local memory (e.g., the main memory 216), which has been allocated to the processor cores of the respective NUMA domain 300. Further, the local memory is directly linked to the physical processor package on which the processor cores reside. In the illustrative embodiment, the NUMA domain (1) 302 includes a local memory (1) 304 and the NUMA domain (2) 308 includes a local memory (2) 310. In some embodiments, data may be transmitted between the NUMA domains 300 via an interconnect 314 (e.g., an Intel® UltraPath Interconnect (UPI), an Intel® QuickPath Interconnect (QPI), an AMD® Unified Media Interface (UMI) interconnect, or the like). The local memory of one of the NUMA domains 300 is considered to be remote, or foreign, relative to the other NUMA domains 300. Accordingly, it should be appreciated that network traffic transmitted across the interconnect 314 may introduce load/contention, increase overall bandwidth usage, and reduce latency associated with accesses to remote memory, as compared to data being processed using the local memory.

Each of the illustrative processors 202, 208 additionally includes an on-die interconnect (e.g., the on-die interconnect 306 of the processor 202 and the on-die interconnect 312 of the processor 208) configured to interface with the HFI 222 via point-to-point interfaces 316 capable of facilitating the transfer of data between the HFI 222 and the processors 202, 208. In some embodiments, the NUMA domains 300 may be defined internally in the HFI 222. In an illustrative example, one of the NUMA domains 300 (e.g., the NUMA domain (1) 302) of one of the network nodes 102 (e.g., the compute node (1) 106) may correspond to transactions processed by the HFI 222 from another of the network nodes 102 (e.g., the compute node (2) 108). Accordingly, the HFI 222 of the compute node (1) 106 can issue throttling messages to the compute node (2) 108 upon a determination by the compute node (1) 106 that the compute node (2) 108 is issuing too many requests to the compute node (1) 106. In some embodiments, such throttling messages may include information propagated from caching agents of the processor 202 received by the HFI 222 via the point-to-point interfaces 316.

Figure 4:
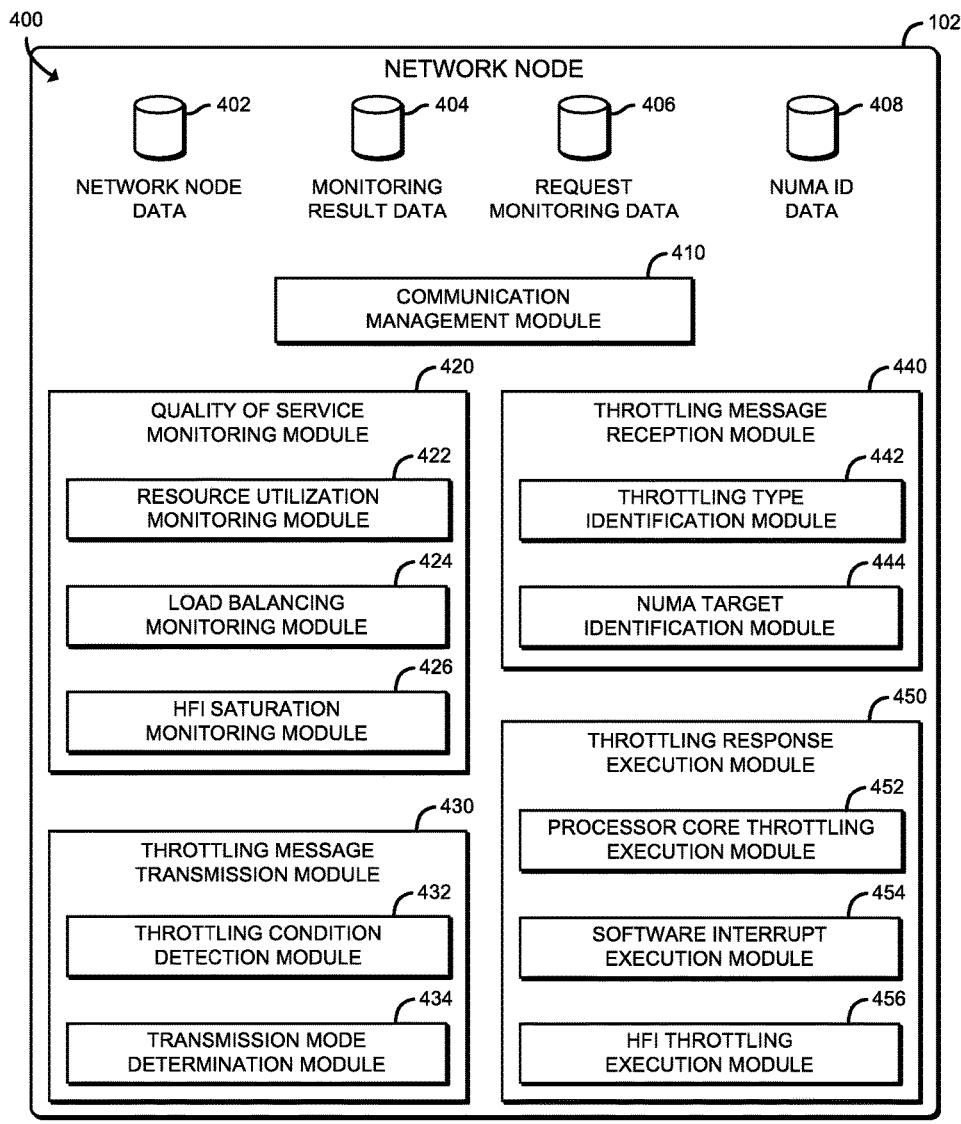
FIG. 4 is a simplified block diagram of at least one embodiment of an environment that may be established by the network node of FIG. 2.

Referring now to FIG. 4, in an illustrative embodiment, one of the network nodes 102 establishes an environment 400 during operation. The illustrative environment 400 includes a communication management module 410, a quality of service (QoS) monitoring module 420, a throttling message transmission module 430, a throttling message reception module 440, and a throttling response execution module 450. The various modules of the environment 400 may be embodied as hardware, firmware, software, or a combination thereof. As such, in some embodiments, one or more of the modules of the environment 400 may be embodied as circuitry or collection of electrical devices (e.g., a communication management circuit 410, a QoS monitoring circuit 420, a throttling message transmission circuit 430, a throttling message reception circuit 440, a throttling response execution circuit 450, etc.).

It should be appreciated that, in such embodiments, one or more of the communication management circuit 410, the QoS monitoring circuit 420, the throttling message transmission circuit 430, the throttling message reception circuit 440, and the throttling response execution circuit 450 may form a portion of one or more processors (e.g., processor (1) 202 and processor (2) 208 of FIG. 2), the I/O subsystem 214, the communication circuitry 220, and/or other components of the network nodes 102. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the one or more processors and/or other components of the network nodes 102.

In the illustrative environment 400, the network node 102 further includes network node data 402, monitoring result data 404, request monitoring data 406, and NUMA identification data 408, each of which may be stored in the main memory 216 and/or the data storage device 218 of the network node 102. Further, each of the network node data 402, the monitoring result data 404, the request monitoring data 406, and the NUMA identification data 408 may be accessed by the various modules and/or sub-modules of the network node 102. Additionally, it should be appreciated that in some embodiments the data stored in, or otherwise represented by, each of the network node data 402, the monitoring result data 404, the request monitoring data 406, and the NUMA identification data 408 may not be mutually exclusive relative to each other.

For example, in some implementations, data stored in the network node data 402 may also be stored as a portion of the monitoring result data 404, and/or vice versa. As such, although the various data utilized by the network node 102 is described herein as particular discrete data, such data may be combined, aggregated, and/or otherwise form portions of a single or multiple data sets, including duplicative copies, in other embodiments. It should be further appreciated that the network node 102 may include additional and/or alternative components, sub-components, modules, sub-modules, and/or devices commonly found in a computing device, which are not illustrated in FIG. 4 for clarity of the description.

The communication management module 410, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the network node 102. To do so, the communication management module 410 is configured to receive and process network packets from other network nodes 102 via the interconnect fabric. Additionally, the communication management module 410 is configured to prepare and transmit network packets to other network nodes 102 via the interconnect fabric. Accordingly, in some embodiments, at least a portion of the functionality of the communication management module 410 may be performed by the communication circuitry 220 of the network node 102, or more specifically by the HFI 222 of the communication circuitry 220. In some embodiments, data usable to communicate with the other network nodes 102 of the fabric architecture, such as IP address information, flow information, etc., may be stored in the network node data.

The QoS monitoring module 420, which may be embodied as hardware, firmware, software, virtualized hardware, emulated architecture, and/or a combination thereof as discussed above, is configured to monitor various characteristics of the network node 102. To do so, the illustrative QoS monitoring module 420 includes a resource utilization monitoring module 422, a load balancing monitoring module 424, and an HFI saturation monitoring module 426. It should be appreciated that each of the resource utilization monitoring module 422, the load balancing monitoring module 424, and the HFI saturation monitoring module 426 of the QoS monitoring module 420 may be separately embodied as hardware, firmware, software, virtualized hardware, emulated architecture, and/or a combination thereof. For example, the resource utilization monitoring module 422 may be embodied as a hardware component, while the load balancing monitoring module 424 and/or the HFI saturation monitoring module 426 may be embodied as a virtualized hardware component or as some other combination of hardware, firmware, software, virtualized hardware, emulated architecture, and/or a combination thereof.

The resource utilization monitoring module 422 is configured to monitor utilization levels of the resources (i.e., physical and/or virtual components) of the network node 102. In an illustrative example, the resource utilization monitoring module 422 may be configured to monitor memory utilization levels. To do so, in some embodiments, the resource utilization monitoring module 422 may be configured to receive throttling signals presently generated by one or more local caching agents of a processor of the network node 102 that is usable to slow down or otherwise reduce an injection rate to a given memory type indicated by the throttling signals. Additionally or alternatively, the resource utilization monitoring module 422 may be configured to identify present usage levels of the resources to determine a saturation level of the monitored resources.

The load balancing monitoring module 424 is configured to monitor the distribution of workloads across the resources (i.e., physical and/or virtual components) of the network node 102. The HFI utilization monitoring module 426 is configured to monitor utilization of the HFI 222. Accordingly, the HFI utilization monitoring module 426 can detect a saturation of the HFI 222 even if the resources attached thereto have not become saturated. In an illustrative example, one of the compute nodes 104 may saturate an HFI 222 of one of the storage nodes 112 when accessing storage devices of the storage node 112. Under such conditions, the HFI 222 of the storage node 112 may become saturated, while the storage devices of the storage node 112 may not be fully utilized (i.e., saturated). In some embodiments, the monitoring results (e.g., present/historical utilization values, present/historical load balancing information, etc.) may be stored in the monitoring result data 404.

The throttling message transmission module 430, which may be embodied as hardware, firmware, software, virtualized hardware, emulated architecture, and/or a combination thereof as discussed above, is configured to generate and transmit throttling messages to the other network nodes 102. As described previously, certain conditions (i.e., throttling conditions) may exist on the network node 102 such that resource access requests generated by the network node 102 requesting access to local resources of the network node 102 may become starved due to the other network nodes 102 maintaining an unencumbered injection rate to resources that are locally throttled. Accordingly, unlike present technologies that only provide local throttling, the network node 102 is configured to detect such throttling conditions and generate a throttling message for transmission to the other network nodes 102 responsible for, or otherwise contributing to, the throttling conditions.

To generate and transmit throttling messages to the other network nodes 102, the illustrative throttling message transmission module 430 includes a throttling condition detection module 432 and a transmission mode determination module 434. It should be appreciated that each of the throttling condition detection module 432 and the transmission mode determination module 434 of the QoS monitoring module 420 may be separately embodied as hardware, firmware, software, virtualized hardware, emulated architecture, and/or a combination thereof. For example, the throttling condition detection module 432 may be embodied as a hardware component, while the transmission mode determination module 434 is embodied as a virtualized hardware component or as some other combination of hardware, firmware, software, virtualized hardware, emulated architecture, and/or a combination thereof.

The throttling condition detection module 432 is configured to detect whether a throttling condition exists. To do so, the throttling condition detection module 432 may be configured to compare present quality of service conditions (e.g., as may be determined by the QoS monitoring module 420) to corresponding thresholds. For example, the throttling condition detection module 432 may be configured to compare a present memory utilization level against a memory saturation threshold. Accordingly, the throttling condition detection module 432 may detect a throttling condition upon a determination that the present memory utilization level exceeds the memory saturation threshold. Additionally or alternatively, the throttling condition detection module 432 may be configured to process throttling signals generated inside the network node 102. As described previously, an agent entity (e.g., a caching agent, a home agent, etc.) may generate local throttle requests to particular on-die clusters, such as memory or I/O. Accordingly, the throttling condition detection module 432 is configured to interpret such local throttle requests to determine whether they indicate a throttling condition whereby one or more of the other network nodes 102 should be notified to take an appropriate throttling action.

The transmission mode determination module 434 is configured to determine which transmission mode to use to transmit the throttling message generated in response to a detected throttling condition, as may be detected by the throttling condition detection module 432. To do so, the transmission mode determination module 434 is configured to detect which one or more of the network nodes 102 to transmit the throttling message based on the identified other network node(s) 102 responsible for, or otherwise contributing to, the throttling condition. For example, the transmission mode determination module 434 may determine a single network node 102 is issuing too many memory access requests, in which case the transmission mode determination module 434 may determine to transmit the generated throttling message using a unicast mode. Otherwise, if the transmission mode determination module 434 determines more than one of the network nodes 102 is responsible for, or otherwise contributing to, the present throttling condition, the transmission mode determination module 434 may determine to transmit the generated throttling message using a multicast mode.

As described previously, the throttling message transmission module 430 is configured to transmit throttling messages requesting another network node 102 take an action (e.g., throttle processor cores of a particular NUMA domain) in response to receipt of the throttling messages. Each of the NUMA domains 300 of each of the network nodes 102 has a corresponding NUMA domain identifier usable by the throttling message transmission module 430 to determine which NUMA domain 300 is to be throttled. Accordingly, the network node 102 includes NUMA domain identifiers of the NUMA domains 300 local to the network node 102 as well as NUMA domain identifiers of the NUMA domains of the other network nodes 102. However, in some embodiments, the NUMA domain identifiers may not be known, such as in distributed tag directory schemes. In such embodiments, the throttling message transmission module 430 can predict which NUMA domain 300 the receiving network nodes 102 will perform the responsive action.

To do so, the throttling message transmission module 430 may be further configured to predict which NUMA domain 300 a receiving network node 102 will take action upon based on the principle that applications accessing NUMA domains will operate within a certain range of memory addresses in that NUMA domain. An on-die interconnect interface (e.g., one of the point-to-point interfaces 316 of FIG. 3) of the network node 102 is configured to generate requests to an agent entity, such as the caching agents. Accordingly, the on-die interconnect interface may be extended to use a domain prediction table to determine which NUMA domain corresponds to the throttling message, as well as whether the NUMA domain (e.g., a processor core of the NUMA domain) is presently distressed (i.e., has been throttled for that NUMA domain). If a component of the NUMA domain is presently distressed, the throttling message may not be issued (i.e., injected) to the agent entity until the distress is no longer present and acknowledged by the agent entity. Accordingly, use of the domain prediction table may allow the network node 102 to speculate the affected NUMA domain 300 of the other network node 102. In some embodiments, data of the domain prediction table may be stored in the NUMA identification data 408.

The domain prediction table may include an identifier of each agent entity, a NUMA level that is known by each of the network nodes 102, a last address range (e.g., formatted as a bit mask) accessed for each of the NUMA domains 300 and/or agent entities, and a granularity which may be configurable per NUMA domain 300. In an illustrative embodiment, the granularity may be 4 GB for a particular NUMA domain 300 and a last address (e.g., 0x78C9657FA) sent to a particular agent entity targeting a particular NUMA level belongs to the address range 0x700000000-0x700000000+4 GB. As described previously, applications accessing NUMA domains will operate within a certain range of memory addresses in that NUMA domain. As such, by appropriately specifying a granularity, it may yield a more accurate prediction, resulting in a high hit rate, as well as return a result within a few cycles. Accordingly, in some embodiments, to predict the NUMA domain of a throttling message targeting a particular address and a particular agent entity, the throttling message transmission module 430 may be configured to access the domain prediction table to retrieve the predicted NUMA domain as a content-addressable memory (CAM) structure. For example, if a use case for an application is to allocate a 10 GB memory block of a storage node 112 via memory exposed as a NUMA domain, the domain prediction requests would most likely hit on the prediction table if the granularity chosen is GM.

In some embodiments, the flow for a throttling message to a particular address to a particular agent entity may include determining a modulus of the last memory address and the granularity to predict the NUMA domain to which the last memory address belongs. If the predicted NUMA domain request returns NULL (i.e., none of the NUMA domains matched) then it may be assumed the closest NUMA domain is NUMA level 0. As described previously, the processor core does not send transactions to the agent entity when a distress signal for the NUMA domain is active and only issues transactions after the distress signal is deactivated and acknowledged by the agent entity. Accordingly, if the distress signal is active for the predicted NUMA domain result, the processor core does not send transactions to the agent entity until the distress signal is deactivated and acknowledged by the agent entity. Additionally, in some embodiments, the agent entity may perform the system address decoding, update appropriate counters (e.g., throttling request counters), and generate the distress signal as necessary. Further, the prediction table is updated according to feedback received upon the agent entity having returned an acknowledgement and a NUMA domain identifier for that specific domain prediction request.

It should be appreciated that the targeted fiber architecture for the QoS-based throttling scheme described herein is directed toward enterprise systems with a scale of hundreds of network nodes 102. Accordingly, in such embodiments with a greater scale, such as a scale of thousands of nodes of high performance computing (HPC) embodiments, the multicast mode may not be ideal for implementation due to the voluminous amount of messages that may be transmitted therein. However, sub-domains of network nodes 102 (e.g., consisting of only those network nodes 102 connected to a specific network switch 116) of the fabric architecture may be defined, such as by using specific multicast topologies, in order to propagate the throttling message to only a subset of the network nodes 102. It should be further appreciated that the multicast mode may be a non-reliable multicast. As described previously, the throttling messages are transmitted periodically over the duration of time in which the throttling condition exists, thereby negating the need to acknowledge the receipt of the throttling messages. The reliability may be improved, such as by adding receipt acknowledgements into the flow; however, such reliability improvement is likely to add more pressure into the fabric.

In some embodiments, the throttling message transmission module 430 (e.g., the throttling condition detection module 432 and/or the transmission mode determination module 434) may utilize a request monitoring table to determine when a throttling message is to be generated and/or to which network nodes 102 the generated throttling message is to be sent. In an illustrative example, the throttling message transmission module 430 may be configured to account for external transactions targeting the local NUMA domain 300 of a particular network node 102. As described previously, each of the NUMA domains 300 has a corresponding NUMA domain identifier usable by the throttling message transmission module 430 to determine which NUMA domain 300 a received throttling message corresponds, as well as a request counter that is incremented with each access.

In some embodiments, the NUMA domain identifier, a value of the request counter, as well as other values (e.g., enumerated values of throttling message request types) may be stored in model-specific registers (MSRs). Accordingly, the throttling message transmission module 430 may be configured to read a value of the request counter to determine whether the request counter exceeds a threshold value. It should be appreciated that the MSR values can be configured during operation or boot time (e.g., using ring zero functions), and may be exposed to the operating system of the network node 102.

In some embodiments, the request counter may be stored in the request monitoring table that includes an identifier of the network node 102 from which the throttling message was received, a present value of the request counter, the NUMA domain identifier, and the threshold value. In some embodiments, the data of the request monitoring table may be stored in the request monitoring data 406. If the request counter exceeds a threshold value, the throttling message transmission module 430 may be configured to generate a throttling message for transmission in unicast mode (i.e., to just the network node 102 responsible for the present state of the request counter). Additionally, the throttling message transmission module 430 may be configured to generate a throttling message for transmission in multicast mode (i.e., to all the other network nodes 102 issuing transactions to a particular NUMA domain) upon receiving a throttling signal internally, such as from a caching agent. As described previously, the throttling message transmission module 430 is configured to generate the throttling message periodically while the throttling condition is detected.

It should be appreciated that the system configurations, such as the NUMA domain identifiers, MSRs in the different network nodes 102, etc., should be done holistically to ensure coherency. Accordingly, the system configurations should be enforced at system boot time (e.g., when the routing system address decoding scheme is performed) to ensure that information conveyed in the throttling messages is consistent across the different network nodes 102. For example, in an embodiment wherein NUMA domain identifiers for compute node (1) 106 are being propagated to compute node (2) 108, compute node (2) 108 should already be aware of which NUMA domain identifier corresponds to the particular NUMA domain 300 of the compute node (1) 106. In some embodiments, the NUMA domain identifiers of the other network nodes 102 may be stored in the NUMA identification data 408.

The throttling message reception module 440, which may be embodied as hardware, firmware, software, virtualized hardware, emulated architecture, and/or a combination thereof as discussed above, is configured to receive and process throttling messages from the other network nodes 102. To do so, the illustrative throttling message reception module 440 includes a throttling type identification module 442 and a NUMA target identification module 444. It should be appreciated that each of the throttling type identification module 442 and the NUMA target identification module 444 of the throttling message reception module 440 may be separately embodied as hardware, firmware, software, virtualized hardware, emulated architecture, and/or a combination thereof. For example, the throttling type identification module 442 may be embodied as a hardware component, while the NUMA target identification module 444 is embodied as a virtualized hardware component or as some other combination of hardware, firmware, software, virtualized hardware, emulated architecture, and/or a combination thereof.

The throttling type identification module 442 is configured to identify a type associated with the received throttling message. As described previously, the throttling message request types associated with the throttling messages may include a memory throttle request, an I/O throttle request, an accelerator throttle processing request, an HFI saturation throttle request, etc. In some embodiments, the throttling message request types may be enumerated such that they can be mapped to a particular action. Additionally, some embodiments, the enumerated values of the throttling message request types may be stored in a throttle action table that maps the enumerated values to the corresponding action. The NUMA target identification module 444 is configured to identify a NUMA domain target, or component thereof, associated with the received throttling message.

The throttling response execution module 450, which may be embodied as hardware, firmware, software, virtualized hardware, emulated architecture, and/or a combination thereof as discussed above, is configured to take an action in response to having received a throttling message from another network node 102. To do so, the illustrative throttling response execution module 450 includes a processor core throttling execution module 452, a software interrupt execution module 454, and an HFI throttling execution module 456. It should be appreciated that each of the processor core throttling execution module 452, the software interrupt execution module 454, and the HFI throttling execution module 456 of the throttling response execution module 450 may be separately embodied as hardware, firmware, software, virtualized hardware, emulated architecture, and/or a combination thereof. For example, the processor core throttling execution module 452 may be embodied as a hardware component, while the software interrupt execution module 454 and/or the HFI throttling execution module 456 may be embodied as a virtualized hardware component or as some other combination of hardware, firmware, software, virtualized hardware, emulated architecture, and/or a combination thereof.

The processor core throttling execution module 452 is configured to throttle processor cores in response to receiving a propagated throttling message. To do so, the processor core throttling execution module 452 is configured to translate a received throttling message to corresponding on-die interconnect throttling signals supported by the network node 102 architecture to reduce an injection rate of externally transmitted access requests. The software interrupt execution module 454 is configured to perform a software interrupt in response to having received a software interrupt request throttling message. To do so, the throttling message is propagated to the software stack via a software interrupt in such embodiments wherein the software stack supports load balancing and injection control mechanisms.

The HFI throttling execution module 456 is configured to throttle injections at the HFI 222 based on the type of throttling message received. In other words, the HFI 222 is responsible for reducing the injection rate or stopping the injection altogether. Accordingly, such a response may be a suitable solution for throttle message types not supported by the fabric architecture of the network nodes 102. It should be appreciated that the processor cores and other injectors of the network node 102 are not being throttled.

Figure 5:
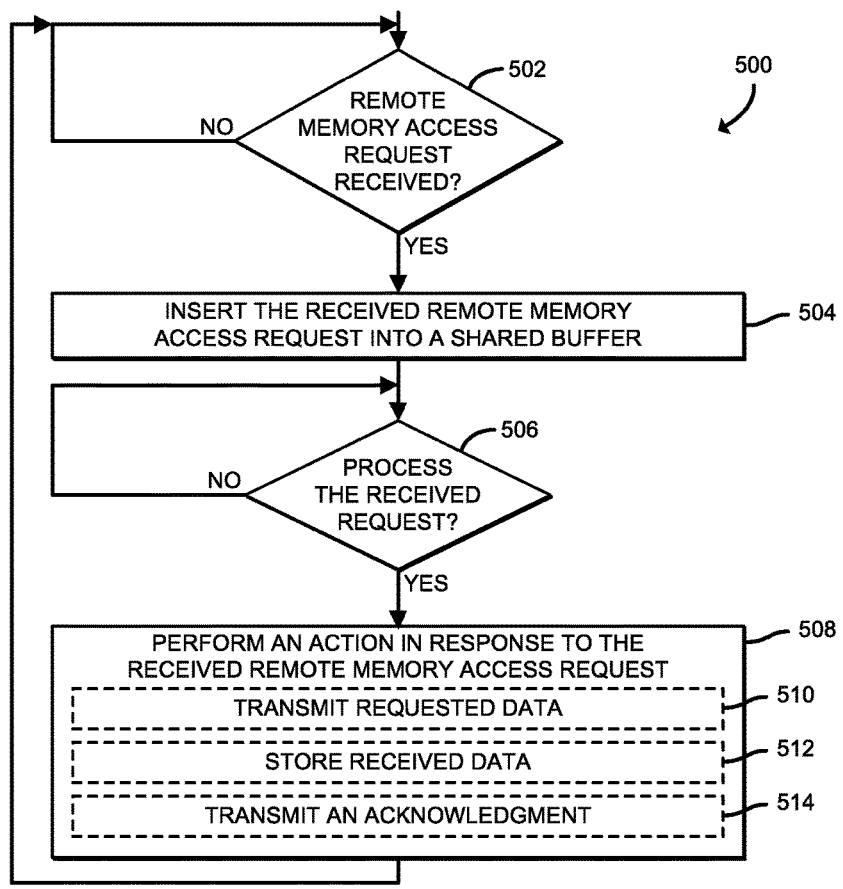
FIG. 5 is a simplified flow diagram of at least one embodiment of a method for processing a local memory request from a remote network node that may be executed by the network node of FIG. 2.

Referring now to FIG. 5, in use, a network node 102 (e.g., one of the network nodes 102 of FIG. 1) may execute a method 500 for processing a local memory request from a remote network node (i.e., another one of the network nodes 102 of the fabric architecture). The method 500 begins in block 502, in which the network node 102 determines whether a memory access request has been received from a remote network node. If not, the method 500 loops back to block 502 to determine whether a memory access request has been received from a remote network node; otherwise, the method 500 advances to block 504. In block 504, the network node 102 inserts the received remote memory access request into a shared buffer of the network node 102. It should be appreciated that, under certain conditions, the shared buffer may be full for a period of time before the network node 102 can insert the received remote memory access request into the shared buffer.

In block 506, the network node 102 determines whether to process the received request (e.g., pop the corresponding entry from the shared buffer and process the request). If so, the method 500 advances to block 508, in which the network node 102 performs an action in response to the received remote memory access request. For example, in block 510, the network node 102 may transmit request data in response to a remote memory access request having requested data stored in memory (e.g., the main memory 216) of the network node 102. Alternatively, in block 512, the network node 102 may store data received with the remote memory access request. In some embodiments, in block 514, the network node 102 may transmit an acknowledgement in response to having received/processed the remote memory access request.

Figure 6:
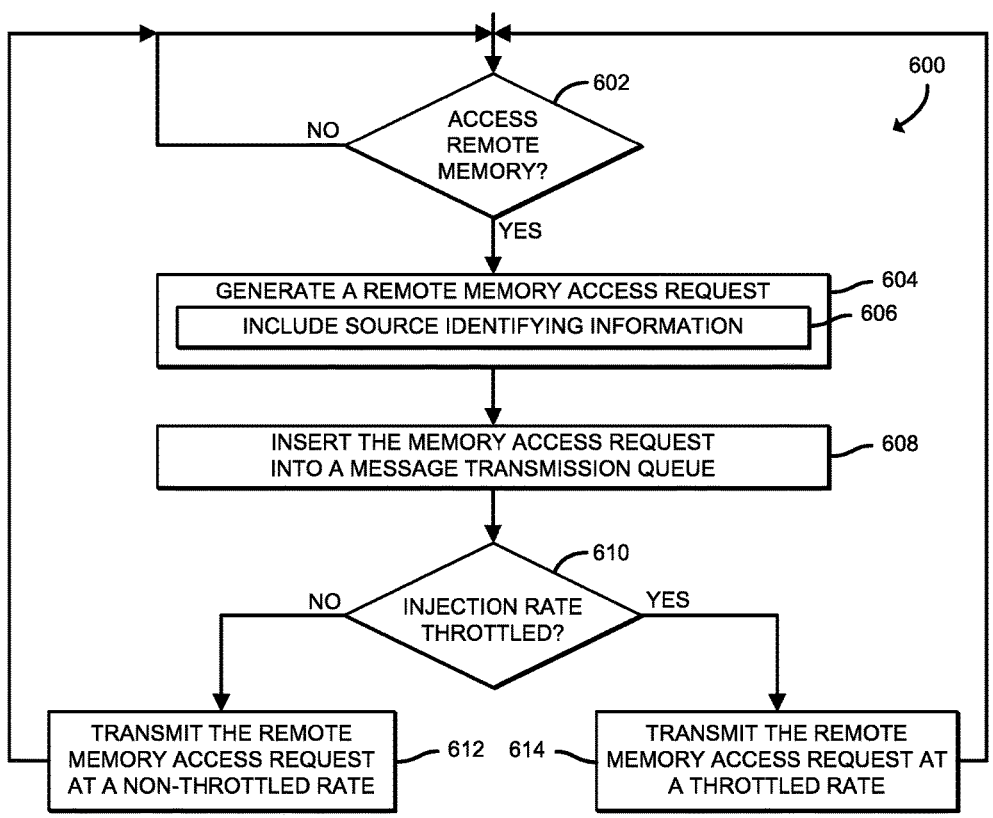
FIG. 6 is a simplified flow diagram of at least one embodiment of a method for accessing memory of a remote network node that may be executed by the network node of FIG. 2.

Referring now to FIG. 6, in use, a network node 102 (e.g., one of the network nodes 102 of FIG. 1) may execute a method 600 for accessing memory of a remote network node (i.e., another one of the network nodes 102 of the fabric architecture). The method 600 begins in block 602, in which the network node 102 determines whether to access memory located in another network node 102. For example, the network node 102 may be retrieving data replicated in remote memory (i.e., memory of the remote network node), executing an application utilizing distributed data structures on one or more remote network nodes, employing log shipping (i.e., relying on a log or micro-log stored on the remote network node for failure recovery), or performing some other operation that requires accessing memory of a remote network node.

If not, the method 600 loops back to block 602 to again determine whether to access memory located in another network node 102; otherwise, the method 600 advances to block 604. In block 604, the network node 102 generates a remote memory access request that includes memory address information usable to retrieve or store data of the remote memory access request. Additionally, in block 606, the network node 102 includes source identifying information of the network node 102. In block 608, the network node 102 inserts the memory access request into a message transmission queue.

Figure 7:
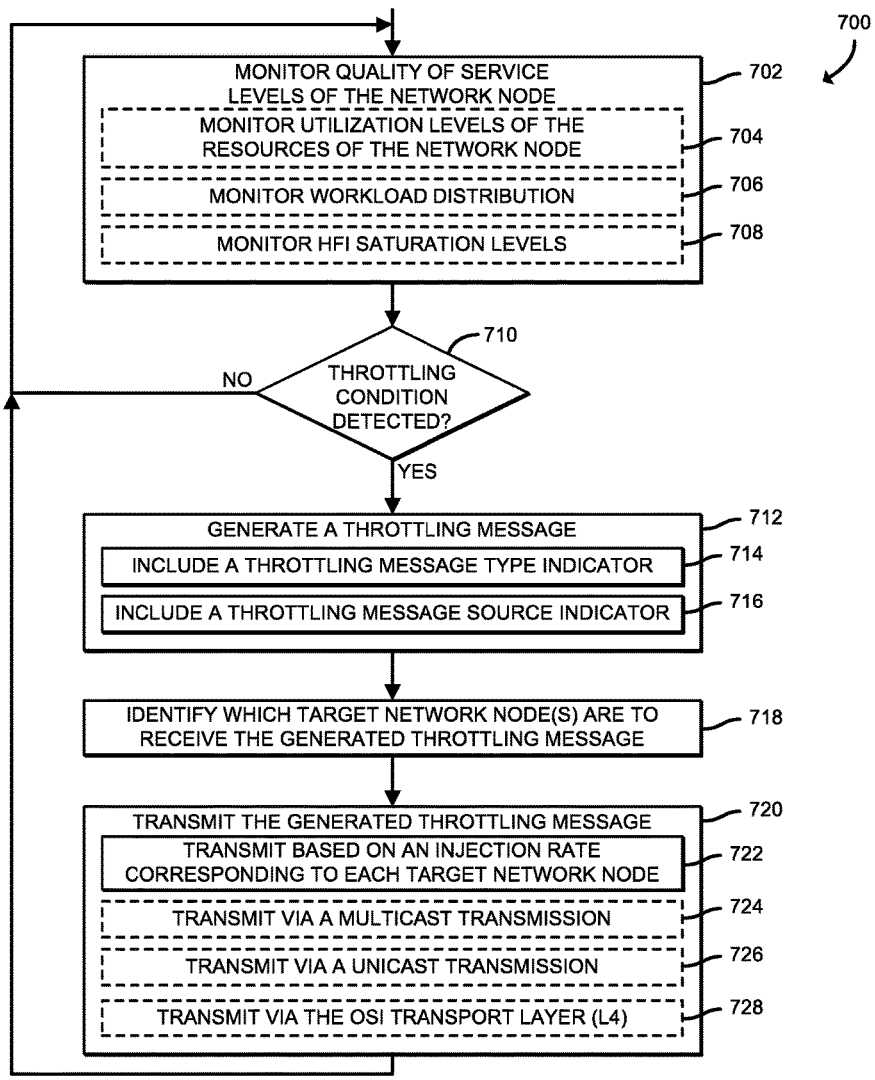
FIG. 7 is a simplified flow diagram of at least one embodiment of a method for generating throttling messages for external transmission to one or more remote network nodes that may be executed by the network node of FIG. 2.

In block 610, the network node 102 determines whether an injection rate corresponding to the component(s) from which the remote memory access request is requesting access has been throttled as a result of throttling messages received from the remote network node (see, e.g., the method 700 of FIG. 7 directed toward generating throttling messages for external transmission to one or more remote network nodes). If not, the method 600 branches to block 612, in which the network node 102 transmits the remote memory access request at a non-throttled injection rate; otherwise, the method 600 branches to block 614, in which the network node 102 transmits the remote memory access request at a throttled rate.

Referring now to FIG. 7, in use, a network node 102 (e.g., one of the network nodes 102 of FIG. 1) may execute a method 700 for generating throttling messages for external transmission to one or more remote network nodes (i.e., one or more of the other network nodes 102). The method 700 begins in block 702, in which the network node 102 monitors quality of service levels of the network node 102. For example, in block 704, the network node 102 monitors utilization levels of the resources (e.g., memory, processors, components of a NUMA domain, etc.) of the network node 102, in some embodiments. Additionally or alternatively, in block 706, the network node 102 monitors the distribution of the workloads distributed across the components of the network node 102, in some embodiments. In block 708, the network node 102 additionally or alternatively monitors saturation levels of the HFI 222 of the network node 102, in some embodiments. As described previously, in some embodiments, the network node 102 may rely on a request monitoring table to determine when the throttling messages are to be generated for a particular NUMA domain 300.

As also described previously, certain conditions (i.e., throttling conditions) may exist on the network node 102 such that resource access requests generated by the network node 102 requesting access to local resources of the network node 102 may become starved due to remote network nodes 102 maintaining an unencumbered injection rate to resources that are locally throttled. Accordingly, in block 710, the network node 102 determines whether a throttling condition (e.g., congestion, saturation, over-utilization, workload distribution unfairness, etc., of a component of the network node 102) has been detected (i.e., presently exists) as a result of the quality of service monitoring performed in block 702.

If the network node 102 determines that a throttling condition does not exist, the method 700 loops back to block 702 to continue monitoring the quality of service levels of the network node 102; otherwise, the method 700 advances to block 712, in which the network node 102 generates a throttling message. In block 714, the network node 102 includes a throttling message request type indicator with the throttling message. As described previously, the throttling message request types associated with the throttling messages may include a memory throttle request, an I/O throttle request, an accelerator throttle processing request, an HFI saturation throttle request, etc. Additionally, in block 716, the network node 102 includes a throttling message source indicator. The throttling message source indicator may include an identifier of the component (e.g., a NUMA domain identifier, an HFI identifier) for which the throttling condition has been detected and/or an identifier of the network node 102.

In block 718, the network node 102 identifies one or more target network nodes (i.e., one or more of the other network nodes 102 of the fabric architecture) that are to receive the throttling message generated in block 712. As described previously, in some embodiments, the network node 102 may rely on a request monitoring table to determine the one or more target network nodes. In block 720, the network node 102 transmits the generated throttling message to the one or more target network nodes identified in block 718. To do so, in block 722, the network node 102 transmits the generated throttling message based on a cycle rate corresponding to each of the target network nodes.

Depending on the number of target network nodes identified in block 718, the network node 102 may transmit the generated throttling message via a multicast transmission (i.e., more than one target network node) in block 724, or via a unicast transmission (i.e., a single target network node) in block 726. Additionally, in some embodiments, in block 728, the network node 102 may transmit the generated throttling message via the transport layer of the OSI model. To do so, in some embodiments, the fabric may be extended with a new type of virtual channel that facilitates the transfer of the throttling messages in order to segregate the throttling messages from the existing channels of the fabric. Such embodiments may be implemented via a new type of physical wire that takes fastest paths inside the fabric in order to deliver the throttling messages as fast as possible.

As described previously, the throttling messages are transmitted periodically over the course of the detected throttling condition. As such, the method 700 may monitor quality of service levels relative to that specific throttling condition and iterate the method 700 as a result of that specific quality of service level monitoring.

Figure 8:
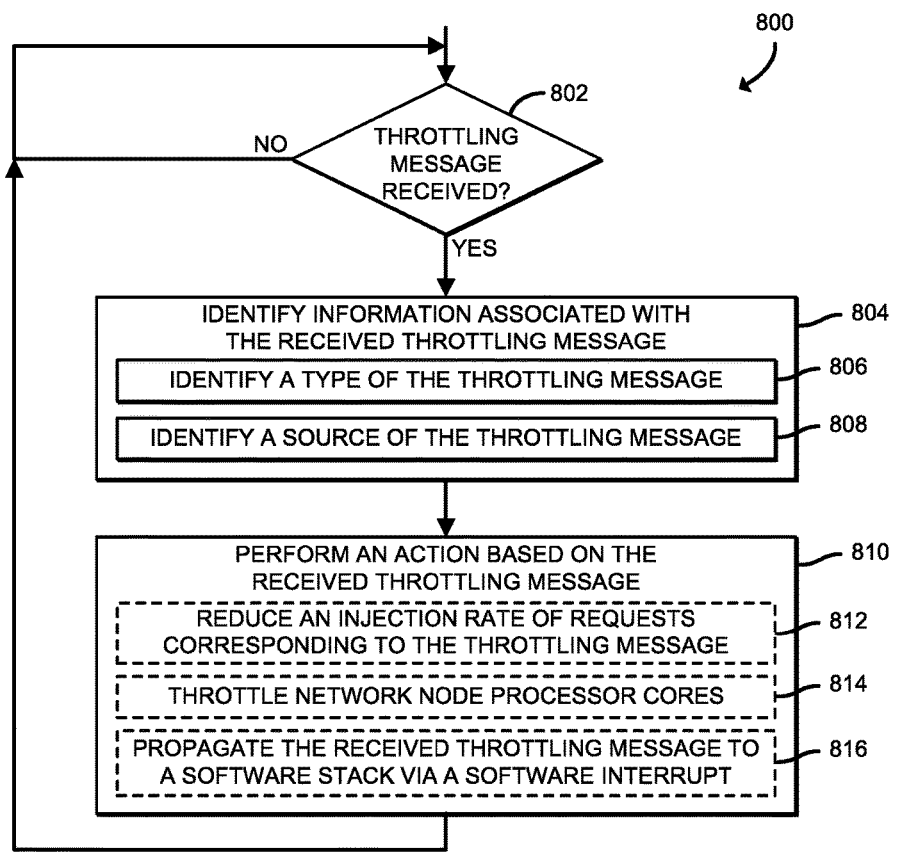
FIG. 8 is a simplified flow diagram of at least one embodiment of a method for processing throttling messages received from a remote network node that may be executed by the network node of FIG. 2.

Referring now to FIG. 8, in use, a network node 102 (e.g., one of the network nodes 102 of FIG. 1) may execute a method 800 for processing throttling messages received from a remote network node (i.e., one of the other network nodes 102). The method 800 begins in block 802, in which the network node 102 determines whether a throttling message has been received from a remote network node. If not, the method 800 loops back to block 802 to again determine whether a throttling message has been received from a remote network node; otherwise, the method 800 advances to block 804, in which the network node 102 identifies information associated with the throttling message received in block 802.

For example, in block 806, the network node 102 identifies a type of the throttling message. As described previously, the throttling message request types associated with the throttling messages may include a memory throttle request, an I/O throttle request, an accelerator throttle processing request, an HFI saturation throttle request, etc. Additionally, in block 808, the network node 102 identifies a source of the throttling message. The source of the throttling message may include information that identifies the target network node from which the throttling message was received. Additionally, the source of the throttling message may include a component identifier (e.g., a NUMA identifier) identifying a component of the remote network node from which the throttling quest was received. In some embodiments, the throttling message may additionally include component information of the receiving network node 102 usable to identify which network node 102 resources, from which remote memory accesses are being requested, are to be throttled.

In block 810, the network node 102 performs an action based on the received throttling message, such as may be based on the type of the throttling message identified in block 806. For example, in block 812, the network node 102 may reduce an injection rate for shared resource access requests being transmitted to (i.e., targeting) the remote network node by self-throttling requests by the HFI 222 of the network node 102. In another example, in block 814, the network node 102 may throttle processor cores of the network node 102 by using the existing throttling schemes. To do so, the network node 102 may propagate the received throttling message to an agent entity (e.g., a caching agent) via a corresponding on-die interconnect (e.g., the on-die interconnect 306 of the processor 202, the on-die interconnect 312 of the processor 208, etc.) to throttle processor cores of the network node 102 by using the existing throttling schemes. In still another example, in block 816, in such embodiments wherein the software stack supports load balancing and injection control mechanisms, the network node 102 may propagate the received throttling message to a software stack via a software interrupt.

It should be appreciated that at least a portion of one or more of the methods 500, 600, 700, and 800 may be executed by the HFI 222 of the network nodes 102. It should be further appreciated that, in some embodiments, one or more of the methods 500, 600, 700, and 800 may be embodied as various instructions stored on a computer-readable media, which may be executed by a processor (e.g., the processor 202, the processor 208, etc.), the HFI 222, and/or other components of the network nodes 102 to cause the network nodes 102 to perform the methods 500, 600, 700, and 800. The computer-readable media may be embodied as any type of media capable of being read by the network nodes 102 including, but not limited to, the main memory 216, the data storage device 218, a secure memory (not shown) of the HFI 222, other memory or data storage devices of the network nodes 102, portable media readable by a peripheral device of the network nodes 102, and/or other media.

EXAMPLES

Illustrative examples of the technologies disclosed herein are provided below. An embodiment of the technologies may include any one or more, and any combination of, the examples described below.

Example 1 includes a network node for quality of service based throttling in a fabric architecture in which the network node is one of a plurality of interconnected network nodes of the fabric architecture, the network node comprising a processor; a host fabric interface (HFI) to facilitate the transmission of data between the plurality of interconnected network nodes over an interconnect fabric of the fabric architecture; and one or more data storage devices having stored therein a plurality of instructions that, when executed by the processor, cause the network node to monitor quality of service levels of the network node; detect a throttling condition based on a result of the monitored quality of service levels; generate, in response to having detected the throttling condition, a throttling message based on a request type associated with the throttling condition detected; and transmit the generated throttling message to one or more of the plurality of interconnected network nodes communicatively coupled to the network node via the interconnect fabric.

Example 2 includes the subject matter of Example 1, and wherein to monitor quality of service levels of the network node comprises to monitor utilization levels of one or more resources of the network node.

Example 3 includes the subject matter of any of Examples 1 and 2, and wherein the one or more resources of the network node include at least one of the processor, the one or more data storage devices, or the HFI.

Example 4 includes the subject matter of any of Examples 1-3, and wherein the one or more resources of the network node include a plurality of non-uniform memory access (NUMA) domains, wherein each of the plurality of NUMA domains includes an allocated portion of processor cores of the processor and an allocated portion of the one or more data storage devices, and wherein each of the plurality of NUMA domains is communicatively coupled to the HFI via an on-die interconnect of the processor.

Example 5 includes the subject matter of any of Examples 1-4, and wherein to monitor the quality of service levels of the network node comprises to monitor a workload distribution.

Example 6 includes the subject matter of any of Examples 1-5, and wherein to monitor the quality of service levels of the network node comprises to monitor a saturation level of the HFI.

Example 7 includes the subject matter of any of Examples 1-6, and wherein to monitor the quality of service levels of the network node comprises to monitor throttling signals received from an agent entity of the processor.

Example 8 includes the subject matter of any of Examples 1-7, and wherein the plurality of interconnected network nodes includes one or more compute nodes and one or more storage nodes.

Example 9 includes the subject matter of any of Examples 1-8, and wherein to transmit the generated throttling message to the one or more of the plurality of interconnected network nodes comprises to transmit the generated throttling message to one of the plurality of interconnected network nodes via a unicast transmission.

Example 10 includes the subject matter of any of Examples 1-9, and wherein to transmit the generated throttling message to the one or more of the plurality of interconnected network nodes comprises to transmit the generated throttling message to more than one of the plurality of interconnected network nodes via a multicast transmission.

Example 11 includes the subject matter of any of Examples 1-10, and wherein to transmit the generated throttling message to the one or more of the plurality of interconnected network nodes comprises to transmit the generated throttling message to the one or more of the plurality of interconnected network nodes via a transport layer of the Open Systems Interconnection (OSI) model.

Example 12 includes the subject matter of any of Examples 1-11, and wherein to transmit the generated throttling message to the one or more of the plurality of interconnected network nodes comprises to transmit the generated throttling message to the one or more of the plurality of interconnected network nodes at a periodic injection rate for a duration of the detected throttling condition.

Example 13 includes a network node for quality of service based throttling in a fabric architecture in which the network node is one of a plurality of interconnected network nodes of the fabric architecture, the network node comprising a quality of service monitoring circuit to monitor quality of service levels of the network node between a host fabric interface (HFI) of the network node and one or more HFIs of the other interconnected network nodes over an interconnect fabric of the fabric architecture; a throttling message transmission circuit to (i) detect a throttling condition based on a result of the monitored quality of service levels, (ii) generate, in response to having detected the throttling condition, a throttling message based on a request type associated with the throttling condition detected, and (iii) transmit the generated throttling message to one or more of the plurality of interconnected network nodes communicatively coupled to the network node via the interconnect fabric.

Example 14 includes the subject matter of Example 13, and wherein to monitor quality of service levels of the network node comprises to monitor utilization levels of one or more resources of the network node.

Example 15 includes the subject matter of any of Examples 13 and 14, and wherein the one or more resources of the network node include at least one of a processor of the network node, one or more data storage devices of the network node, or the HFI.

Example 16 includes the subject matter of any of Examples 13-15, and wherein the one or more resources of the network node include a plurality of non-uniform memory access (NUMA) domains, wherein each of the plurality of NUMA domains includes an allocated portion of processor cores of the processor and an allocated portion of the one or more data storage devices, and wherein each of the plurality of NUMA domains is communicatively coupled to the HFI via an on-die interconnect of the processor.

Example 17 includes the subject matter of any of Examples 13-16, and wherein to monitor the quality of service levels of the network node comprises to monitor a workload distribution.

Example 18 includes the subject matter of any of Examples 13-17, and wherein to monitor the quality of service levels of the network node comprises to monitor a saturation level of the HFI.

Example 19 includes the subject matter of any of Examples 13-18, and wherein to monitor the quality of service levels of the network node comprises to monitor throttling signals received from an agent entity of the processor.

Example 20 includes the subject matter of any of Examples 13-19, and wherein the plurality of interconnected network nodes includes one or more compute nodes and one or more storage nodes.

Example 21 includes the subject matter of any of Examples 13-20, and wherein to transmit the generated throttling message to the one or more of the plurality of interconnected network nodes comprises to transmit the generated throttling message to one of the plurality of interconnected network nodes via a unicast transmission.

Example 22 includes the subject matter of any of Examples 13-21, and wherein to transmit the generated throttling message to the one or more of the plurality of interconnected network nodes comprises to transmit the generated throttling message to more than one of the plurality of interconnected network nodes via a multicast transmission.

Example 23 includes the subject matter of any of Examples 13-22, and wherein to transmit the generated throttling message to the one or more of the plurality of interconnected network nodes via a transport layer of the Open Systems Interconnection (OSI) model.

Example 24 includes the subject matter of any of Examples 13-23, and wherein to transmit the generated throttling message to the one or more of the plurality of interconnected network nodes comprises to transmit the generated throttling message to the one or more of the plurality of interconnected network nodes at a periodic injection rate for a duration of the detected throttling condition.

Example 25 includes a method for quality of service based throttling across a fabric architecture, the method comprising monitoring, by a host fabric interface (HFI) of a network node of the fabric architecture, quality of service levels of the network node, wherein the network node is one of a plurality of interconnected network nodes of the fabric architecture, wherein each of the plurality of interconnected network nodes is interconnected over an interconnect fabric of the fabric architecture; detecting, by the HFI, a throttling condition based on a result of the monitored quality of service levels; generating, by the HFI, in response to having detected the throttling condition, a throttling message based on a request type associated with the throttling condition detected; and transmitting, by the HFI, the generated throttling message to one or more of the plurality of interconnected network nodes communicatively coupled to the network node via the interconnect fabric.

Example 26 includes the subject matter of Example 25, and wherein monitoring the quality of service levels of the network node comprises monitoring utilization levels of one or more resources of the network node.

Example 27 includes the subject matter of any of Examples 25 and 26, and wherein monitoring the utilization levels of one or more resources of the network node comprises monitoring at least one of a processor of the network node, one or more data storage devices of the network node, or the HFI.

Example 28 includes the subject matter of any of Examples 25-27, and wherein monitoring the utilization levels of one or more resources of the network node comprises monitoring one or more of a plurality of non-uniform memory access (NUMA) domains, wherein each of the plurality of NUMA domains includes an allocated portion of processor cores of a processor of the network node and an allocated portion of one or more data storage devices of the network node, and wherein each of the plurality of NUMA domains is communicatively coupled to the HFI via an on-die interconnect of the processor.

Example 29 includes the subject matter of any of Examples 25-28, and wherein monitoring the quality of service levels of the network node comprises monitoring a workload distribution.

Example 30 includes the subject matter of any of Examples 25-29, and wherein monitoring the quality of service levels of the network node comprises monitoring a saturation level of the HFI.

Example 31 includes the subject matter of any of Examples 25-30, and wherein monitoring the quality of service levels of the network node comprises monitoring throttling signals received from an agent entity of the processor.

Example 32 includes the subject matter of any of Examples 25-31, and wherein the plurality of interconnected network nodes includes one or more compute nodes and one or more storage nodes.

Example 33 includes the subject matter of any of Examples 25-32, and wherein transmitting the generated throttling message to the one or more of the plurality of interconnected network nodes comprises transmitting the generated throttling message to one of the plurality of interconnected network nodes via a unicast transmission.

Example 34 includes the subject matter of any of Examples 25-33, and wherein transmitting the generated throttling message to the one or more of the plurality of interconnected network nodes comprises transmitting the generated throttling message to more than one of the plurality of interconnected network nodes via a multicast transmission.

Example 35 includes the subject matter of any of Examples 25-34, and wherein transmitting the generated throttling message to the one or more of the plurality of interconnected network nodes comprises transmitting the generated throttling message to the one or more of the plurality of interconnected network nodes via a transport layer of the Open Systems Interconnection (OSI) model.

Example 36 includes the subject matter of any of Examples 25-35, and wherein transmitting the generated throttling message to the one or more of the plurality of interconnected network nodes comprises transmitting the generated throttling message to the one or more of the plurality of interconnected network nodes at a periodic injection rate for a duration of the detected throttling condition.

Example 37 includes a network node comprising a processor; and a memory having stored therein a plurality of instructions that when executed by the processor cause the network node to perform the method of any of Examples 25-36.

Example 38 includes one or more machine readable storage media comprising a plurality of instructions stored thereon that in response to being executed result in a network node performing the method of any of Examples 25-36.

Example 39 includes a network node for quality of service based throttling in a fabric architecture in which the network node is one of a plurality of interconnected network nodes of the fabric architecture, the network node comprising means for monitoring quality of service levels of the network node at a host fabric interface (HFI) of the network node, wherein the network node is one of a plurality of interconnected network nodes of the fabric architecture, wherein each of the plurality of interconnected network nodes is interconnected over an interconnect fabric of the fabric architecture; means for detecting a throttling condition based on a result of the monitored quality of service levels; means for generating in response to having detected the throttling condition, a throttling message based on a request type associated with the throttling condition detected; and means for transmitting the generated throttling message to one or more of the plurality of interconnected network nodes communicatively coupled to the network node via the interconnect fabric.

Example 40 includes the subject matter of Example 39, and wherein the means for monitoring the quality of service levels of the network node comprises means for monitoring utilization levels of one or more resources of the network node.

Example 41 includes the subject matter of any of Examples 39 and 40, and wherein the means for monitoring the utilization levels of one or more resources of the network node comprises means for monitoring at least one of a processor of the network node, one or more data storage devices of the network node, or the HFI.

Example 42 includes the subject matter of any of Examples 39-41, and wherein the means for monitoring the utilization levels of one or more resources of the network node comprises means for monitoring one or more of a plurality of non-uniform memory access (NUMA) domains, wherein each of the plurality of NUMA domains includes an allocated portion of processor cores of a processor of the network node and an allocated portion of one or more data storage devices of the network node, and wherein each of the plurality of NUMA domains is communicatively coupled to the HFI via an on-die interconnect of the processor.

Example 43 includes the subject matter of any of Examples 39-42, and wherein the means for monitoring the quality of service levels of the network node comprises means for monitoring a workload distribution.

Example 44 includes the subject matter of any of Examples 39-43, and wherein the means for monitoring the quality of service levels of the network node comprises means for monitoring a saturation level of the HFI.

Example 45 includes the subject matter of any of Examples 39-44, and wherein the means for monitoring the quality of service levels of the network node comprises means for monitoring throttling signals received from an agent entity of the processor.

Example 46 includes the subject matter of any of Examples 39-45, and wherein the plurality of interconnected network nodes includes one or more compute nodes and one or more storage nodes.

Example 47 includes the subject matter of any of Examples 39-46, and wherein the means for transmitting the generated throttling message to the one or more of the plurality of interconnected network nodes comprises means for transmitting the generated throttling message to one of the plurality of interconnected network nodes via a unicast transmission.

Example 48 includes the subject matter of any of Examples 39-47, and wherein the means for transmitting the generated throttling message to the one or more of the plurality of interconnected network nodes comprises means for transmitting the generated throttling message to more than one of the plurality of interconnected network nodes via a multicast transmission.

Example 49 includes the subject matter of any of Examples 39-48, and wherein the means for transmitting the generated throttling message to the one or more of the plurality of interconnected network nodes comprises means for transmitting the generated throttling message to the one or more of the plurality of interconnected network nodes via a transport layer of the Open Systems Interconnection (OSI) model.

Example 50 includes the subject matter of any of Examples 39-49, and wherein the means for transmitting the generated throttling message to the one or more of the plurality of interconnected network nodes comprises means for transmitting the generated throttling message to the one or more of the plurality of interconnected network nodes at a periodic injection rate for a duration of the detected throttling condition.

Example 51 includes a network node for quality of service based throttling in a fabric architecture in which the network node is one of a plurality of interconnected network nodes of the fabric architecture, the network node comprising a processor; a host fabric interface (HFI) to facilitate the transmission of data between the plurality of interconnected network nodes; and one or more data storage devices having stored therein a plurality of instructions that, when executed by the processor, cause the network node to transmit an access request for access to a shared resource of one of the plurality of interconnected network nodes communicatively coupled to the network node via an interconnect fabric of the fabric architecture; receive a throttling message from the one of the plurality of interconnected network nodes; identify information associated with the received throttling message; and perform a throttling action on one or more resources of the network node based in the identified information.

Example 52 includes the subject matter of Example 51, and wherein to receive the throttling message comprises to receive the throttling message via a transport layer of the Open Systems Interconnection (OSI) model.

Example 53 includes the subject matter of any of Examples 51 and 52, and wherein to identify the information associated with the received throttling message comprises to identify at least one of a request type of the received throttling message and a source of the received throttling message.

Example 54 includes the subject matter of any of Examples 51-53, and wherein the request type of the received throttling message comprises one of a memory throttle request, an I/O throttle request, an accelerator throttle processing request, or an HFI saturation throttle request.

Example 55 includes the subject matter of any of Examples 51-54, and wherein to perform the throttling action comprises to reduce an injection rate of the shared resource access requests directed toward the one of the plurality of interconnected network nodes.

Example 56 includes the subject matter of any of Examples 51-55, and wherein to perform the throttling action comprises to throttle processor cores of the processor of the network node.

Example 57 includes the subject matter of any of Examples 51-56, and wherein to throttle the processor cores of the processor of the network node comprises to propagate the received throttling message to an agent entity of the processor for translation to an existing throttling signal.

Example 58 includes the subject matter of any of Examples 51-57, and wherein to perform the throttling action comprises to propagate the received throttling message to a software stack via a software interrupt.

Example 59 includes the subject matter of any of Examples 51-58, and wherein the one or more resources of the network node include at least one of the processor, the one or more data storage devices, or the HFI.

Example 60 includes the subject matter of any of Examples 51-59, and, wherein the one or more resources of the network node include a plurality of non-uniform memory access (NUMA) domains, wherein each of the plurality of NUMA domains includes an allocated portion of processor cores of the processor and an allocated portion of the one or more data storage devices, and wherein each of the plurality of NUMA domains is communicatively coupled to the HFI via an on-die interconnect of the processor.

Example 61 includes a network node for quality of service based throttling in a fabric architecture in which the network node is one of a plurality of interconnected network nodes of the fabric architecture, the network node comprising a communication management circuit to transmit an access request for access to a shared resource of one of the plurality of interconnected network nodes communicatively coupled to the network node via an interconnect fabric of the fabric architecture; a throttling message reception circuit to (i) receive a throttling message from a host fabric interface (HFI) of the one of the plurality of interconnected network nodes and (ii) identify information associated with the received throttling message; and a throttling response execution circuit to perform a throttling action on one or more resources of the network node based in the identified information.

Example 62 includes the subject matter of Example 61, and wherein to receive the throttling message comprises to receive the throttling message via a transport layer of the Open Systems Interconnection (OSI) model.

Example 63 includes the subject matter of any of Examples 61 and 62, and wherein to identify the information associated with the received throttling message comprises to identify at least one of a request type of the received throttling message and a source of the received throttling message.

Example 64 includes the subject matter of any of Examples 61-63, and wherein the request type of the received throttling message comprises one of a memory throttle request, an I/O throttle request, an accelerator throttle processing request, or an HFI saturation throttle request.

Example 65 includes the subject matter of any of Examples 61-64, and wherein to perform the throttling action comprises to reduce an injection rate of the shared resource access requests directed toward the one of the plurality of interconnected network nodes.

Example 66 includes the subject matter of any of Examples 61-65, and wherein to perform the throttling action comprises to throttle processor cores of the processor of the network node.

Example 67 includes the subject matter of any of Examples 61-66, and wherein to throttle the processor cores of the processor of the network node comprises to propagate the received throttling message to an agent entity of the processor for translation to an existing throttling signal.

Example 68 includes the subject matter of any of Examples 61-67, and wherein to perform the throttling action comprises to propagate the received throttling message to a software stack via a software interrupt.

Example 69 includes the subject matter of any of Examples 61-68, and wherein the one or more resources of the network node include at least one of the processor, the one or more data storage devices, or the HFI.

Example 70 includes the subject matter of any of Examples 61-69, and, wherein the one or more resources of the network node include a plurality of non-uniform memory access (NUMA) domains, wherein each of the plurality of NUMA domains includes an allocated portion of processor cores of the processor and an allocated portion of the one or more data storage devices, and wherein each of the plurality of NUMA domains is communicatively coupled to the HFI via an on-die interconnect of the processor.

Example 71 includes a method for quality of service based throttling across a fabric architecture, the network node comprising transmitting, by a host fabric interface (HFI) of a network node, an access request for access to a shared resource of one of a plurality of interconnected network nodes communicatively coupled to the network node via an interconnect fabric of the fabric architecture; receiving, by the HFI, a throttling message from the one of the plurality of interconnected network nodes; identifying, by the HFI, information associated with the received throttling message; and performing, by the HFI, a throttling action on one or more resources of the network node based in the identified information.

Example 72 includes the subject matter of Example 71, and wherein receiving the throttling message comprises receiving the throttling message via a transport layer of the Open Systems Interconnection (OSI) model.

Example 73 includes the subject matter of any of Examples 71 and 72, and wherein identifying the information associated with the received throttling message comprises identifying at least one of a request type of the received throttling message and a source of the received throttling message.

Example 74 includes the subject matter of any of Examples 71-73, and wherein identifying the request type of the received throttling message comprises identifying one of a memory throttle request, an I/O throttle request, an accelerator throttle processing request, or an HFI saturation throttle request.

Example 75 includes the subject matter of any of Examples 71-74, and wherein performing the throttling action comprises reducing an injection rate of the shared resource access requests directed toward the one of the plurality of interconnected network nodes.

Example 76 includes the subject matter of any of Examples 71-75, and wherein performing the throttling action comprises throttling processor cores of a processor of the network node.

Example 77 includes the subject matter of any of Examples 71-76, and wherein throttling the processor cores of the processor of the network node comprises propagating the received throttling message to an agent entity of the processor for translation to an existing throttling signal.

Example 78 includes the subject matter of any of Examples 71-77, and wherein performing the throttling action comprises propagating the received throttling message to a software stack via a software interrupt.

Example 79 includes the subject matter of any of Examples 71-78, and wherein performing the throttling action on the one or more resources of the network node comprises performing the throttling action on at least one of a processor of the network node, one or more data storage devices of the network node, or the HFI.

Example 80 includes the subject matter of any of Examples 71-79, and wherein performing the throttling action on the one or more resources of the network node comprises performing the throttling action on at least one of a plurality of non-uniform memory access (NUMA) domains, wherein each of the plurality of NUMA domains includes an allocated portion of processor cores of a processor of the network node and an allocated portion of one or more data storage devices of the network node, and wherein each of the plurality of NUMA domains is communicatively coupled to the HFI via an on-die interconnect of the processor.

Example 81 includes a network node comprising a processor; and a memory having stored therein a plurality of instructions that when executed by the processor cause the network node to perform the method of any of Examples 71-80.

Example 82 includes one or more machine readable storage media comprising a plurality of instructions stored thereon that in response to being executed result in a network node performing the method of any of Examples 71-80.

Example 83 includes a network node for quality of service based throttling in a fabric architecture in which the network node is one of a plurality of interconnected network nodes of the fabric architecture, the network node comprising means for transmitting, by a host fabric interface (HFI) of the network node, an access request for access to a shared resource of one of a plurality of interconnected network nodes communicatively coupled to the network node via an interconnect fabric of the fabric architecture; means for receiving, by the HFI, a throttling message from the one of the plurality of interconnected network nodes; means for identifying, by the HFI, information associated with the received throttling message; and means for performing, by the HFI, a throttling action on one or more resources of the network node based in the identified information.

Example 84 includes the subject matter of Example 83, and wherein the means for receiving the throttling message comprises means for receiving the throttling message via a transport layer of the Open Systems Interconnection (OSI) model.

Example 85 includes the subject matter of any of Examples 83 and 84, and wherein the means for identifying the information associated with the received throttling message comprises means for identifying at least one of a request type of the received throttling message and a source of the received throttling message.

Example 86 includes the subject matter of any of Examples 83-85, and wherein the means for identifying the request type of the received throttling message comprises means for identifying one of a memory throttle request, an I/O throttle request, an accelerator throttle processing request, or an HFI saturation throttle request.

Example 87 includes the subject matter of any of Examples 83-86, and wherein the means for performing the throttling action comprises means for reducing an injection rate of the shared resource access requests directed toward the one of the plurality of interconnected network nodes.

Example 88 includes the subject matter of any of Examples 83-87, and wherein the means for performing the throttling action comprises means for throttling processor cores of a processor of the network node.

Example 89 includes the subject matter of any of Examples 83-88, and wherein the means for throttling the processor cores of the processor of the network node comprises means for propagating the received throttling message to an agent entity of the processor for translation to an existing throttling signal.

Example 90 includes the subject matter of any of Examples 83-89, and wherein the means for performing the throttling action comprises means for propagating the received throttling message to a software stack via a software interrupt.

Example 91 includes the subject matter of any of Examples 83-90, and wherein the means for performing the throttling action on the one or more resources of the network node comprises means for performing the throttling action on at least one of a processor of the network node, one or more data storage devices of the network node, or the HFI.

Example 92 includes the subject matter of any of Examples 83-91, and wherein the means for performing the throttling action on the one or more resources of the network node comprises means for performing the throttling action on at least one of a plurality of non-uniform memory access (NUMA) domains, wherein each of the plurality of NUMA domains includes an allocated portion of processor cores of a processor of the network node and an allocated portion of one or more data storage devices of the network node, and wherein each of the plurality of NUMA domains is communicatively coupled to the HFI via an on-die interconnect of the processor.

The invention claimed is:

1. A network node for quality of service based throttling in a fabric architecture in which the network node is one of a plurality of interconnected network nodes of the fabric architecture, the network node comprising:
   a processor;
   a host fabric interface (HFI) to facilitate the transmission of data between the plurality of interconnected network nodes over an interconnect fabric of the fabric architecture; and
   one or more data storage devices having stored therein a plurality of instructions that, when executed by the processor, cause the network node to:
   monitor quality of service levels of the network node;
   detect a throttling condition based on a result of the monitored quality of service levels;
   generate, in response to having detected the throttling condition, a throttling message based on a request type associated with the throttling condition detected, wherein the throttling message is usable by a receiving network node to identify a throttling action based on the request type; and
   transmit the generated throttling message to one or more of the plurality of interconnected network nodes communicatively coupled to the network node via the interconnect fabric.

2. The network node of claim 1, wherein to monitor quality of service levels of the network node comprises to monitor utilization levels of one or more resources of the network node, and wherein the one or more resources of the network node include at least one of the processor, the one or more data storage devices, or the HFI.

3. The network node of claim 2, wherein the one or more resources of the network node include a plurality of non-uniform memory access (NUMA) domains, wherein each of the plurality of NUMA domains includes an allocated portion of processor cores of the processor and an allocated portion of the one or more data storage devices, and wherein each of the plurality of NUMA domains is communicatively coupled to the HFI via an on-die interconnect of the processor.

4. The network node of claim 1, wherein to monitor the quality of service levels of the network node comprises to monitor at least one of a workload distribution, a saturation level of the HFI, or throttling signals received from an agent entity of the processor.

5. The network node of claim 1, wherein the plurality of interconnected network nodes includes one or more compute nodes and one or more storage nodes.

6. The network node of claim 1, wherein to transmit the generated throttling message to the one or more of the plurality of interconnected network nodes comprises to one of transmit the generated throttling message to one of the plurality of interconnected network nodes via a unicast transmission or transmit the generated throttling message to more than one of the plurality of interconnected network nodes via a multicast transmission.

7. The network node of claim 1, wherein to transmit the generated throttling message to the one or more of the plurality of interconnected network nodes comprises to transmit the generated throttling message to the one or more of the plurality of interconnected network nodes at a periodic injection rate for a duration of the detected throttling condition.

8. A network node for quality of service based throttling in a fabric architecture in which the network node is one of a plurality of interconnected network nodes of the fabric architecture, the network node comprising:
- a quality of service monitoring circuit to monitor quality of service levels of the network node between a host fabric interface (HFI) of the network node and one or more HFIs of the other interconnected network nodes over an interconnect fabric of the fabric architecture;
- a throttling message transmission circuit to (i) detect a throttling condition based on a result of the monitored quality of service levels, (ii) generate, in response to having detected the throttling condition, a throttling message based on a request type associated with the throttling condition detected, and (iii) transmit the generated throttling message to one or more of the plurality of interconnected network nodes communicatively coupled to the network node via the interconnect fabric, wherein the throttling message is usable by a receiving network node to identify a throttling action based on the request type.

9. The network node of claim 8, wherein to monitor quality of service levels of the network node comprises to monitor utilization levels of one or more resources of the network node, wherein the one or more resources of the network node include at least one of a processor of the network node, one or more data storage devices of the network node, or the HFI.

10. The network node of claim 9, wherein the one or more resources of the network node include a plurality of non-uniform memory access (NUMA) domains, wherein each of the plurality of NUMA domains includes an allocated portion of processor cores of the processor and an allocated portion of the one or more data storage devices, and wherein each of the plurality of NUMA domains is communicatively coupled to the HFI via an on-die interconnect of the processor.

11. The network node of claim 8, wherein to monitor the quality of service levels of the network node comprises to monitor at least one of a workload distribution, a saturation level of the HFI, or throttling signals received from an agent entity of a processor of the network node.

12. The network node of claim 8, wherein the plurality of interconnected network nodes includes one or more compute nodes and one or more storage nodes.

13. The network node of claim 8, wherein to transmit the generated throttling message to the one or more of the plurality of interconnected network nodes comprises to one of transmit the generated throttling message to one of the plurality of interconnected network nodes via a unicast transmission or transmit the generated throttling message to more than one of the plurality of interconnected network nodes via a multicast transmission.

14. The network node of claim 8, wherein to transmit the generated throttling message to the one or more of the plurality of interconnected network nodes comprises to transmit the generated throttling message to the one or more of the plurality of interconnected network nodes at a periodic injection rate for a duration of the detected throttling condition.

* * * * *